(12) United States Patent
Diab et al.

(10) Patent No.: US 8,301,919 B2
(45) Date of Patent: Oct. 30, 2012

(54) SYSTEM AND METHOD FOR IMPLEMENTING FAIRNESS IN THE POWERING OF COMPUTING DEVICES IN A POWER OVER ETHERNET APPLICATION

(75) Inventors: Wael William Diab, San Francisco, CA (US); Hemal Vinodchandra Shah, Trabuco Canyon, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 11 days.

(21) Appl. No.: 13/032,244

(22) Filed: Feb. 22, 2011

(65) Prior Publication Data

US 2011/0145606 A1 Jun. 16, 2011

Related U.S. Application Data

(62) Division of application No. 11/870,807, filed on Oct. 11, 2007, now Pat. No. 7,908,495.

(51) Int. Cl.
*G06F 1/00* (2006.01)
*G06F 1/26* (2006.01)
*G06F 15/173* (2006.01)
*G06F 13/42* (2006.01)

(52) U.S. Cl. ........ 713/300; 713/320; 370/910; 709/226; 710/105

(58) Field of Classification Search .................. 713/300, 713/320; 370/910; 709/226; 710/105
See application file for complete search history.

(56) References Cited

U.S. PATENT DOCUMENTS

| | | | |
|---|---|---|---|
| 7,243,251 B2 * | 7/2007 | Atias et al. ................... | 713/324 |
| 7,392,407 B2 * | 6/2008 | Jonnala et al. ................ | 713/300 |
| 7,589,435 B2 * | 9/2009 | Metsker et al. ................ | 307/32 |
| 7,620,846 B2 | 11/2009 | Biederman et al. | |
| 7,631,201 B2 * | 12/2009 | Hansalia ....................... | 713/300 |
| 7,821,156 B2 * | 10/2010 | Katz et al. ..................... | 307/40 |
| 2003/0149904 A1 | 8/2003 | Kim | |
| 2005/0125507 A1 | 6/2005 | Atias et al. | |
| 2006/0112285 A1 * | 5/2006 | Stineman, Jr. ................. | 713/300 |
| 2006/0212724 A1 * | 9/2006 | Dwelley et al. ............... | 713/300 |
| 2007/0136614 A1 | 6/2007 | Heath et al. | |
| 2008/0005433 A1 | 1/2008 | Diab et al. | |
| 2008/0005600 A1 | 1/2008 | Diab et al. | |
| 2008/0005601 A1 | 1/2008 | Diab | |
| 2008/0016263 A1 | 1/2008 | Diab et al. | |

* cited by examiner

*Primary Examiner* — Stefan Stoynov
(74) *Attorney, Agent, or Firm* — Duane S. Kobayashi

(57) ABSTRACT

A system and method for implementing fairness in the powering of computing devices in a power over Ethernet (PoE) application. Power supplies in a power sourcing equipment are often oversubscribed. This oversubscription can lead to starvation of certain computing devices that have power requests that are not granted relative to competing requests. A fairness consideration can be implemented to ensure that starvation conditions are avoided.

16 Claims, 5 Drawing Sheets

SYSTEM AND METHOD FOR IMPLEMENTING FAIRNESS IN THE POWERING OF COMPUTING DEVICES IN A POWER OVER ETHERNET APPLICATION

This application is a division of non-provisional patent application Ser. No. 11/870,807, filed Oct. 11, 2007, now U.S. Pat. No. 7,908,495. The above-identified application is incorporated by reference herein, in its entirety, for all purposes.

BACKGROUND

1. Field of the Invention

The present invention relates generally to Power over Ethernet (PoE) and, more particularly, to a system and method for implementing fairness in the powering of computing devices in a PoE application.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a Layer 1 power classification.

The power requirements of computing devices can vary significantly depending on various factors such as the computing device components, connected devices (e.g., USB devices), application load, etc. These computing devices are typically connected to enterprise networks on a non-permanent basis such as a conference room. In these usage scenarios, a limited power supply would often be oversubscribed as the various computing devices compete for a fixed amount of available power.

The powering of computing devices using PoE in an enterprise environment places a tremendous burden on a switch. For example, in a conference room of ten people with portable computing devices, a switch could require approximately 25 watts per port. This 250 W total can easily approach or exceed the power capacity of the switch. As the number of users connected to the switch increases, the competition for the power resource grows. Various distribution algorithms can be used in these situations to allocate power to the various computing devices. In one example, the distribution algorithm is based on a request priority. One scenario that can arise in this allocation environment is the creation of a starvation condition for certain computing devices. For these computing devices, their power requests could systematically be denied relative to the requests of competing computing devices. What is needed therefore is a mechanism for enabling a PoE system to avoid such starvation conditions.

SUMMARY

A system and/or method for implementing fairness in the powering of computing devices in a PoE application, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
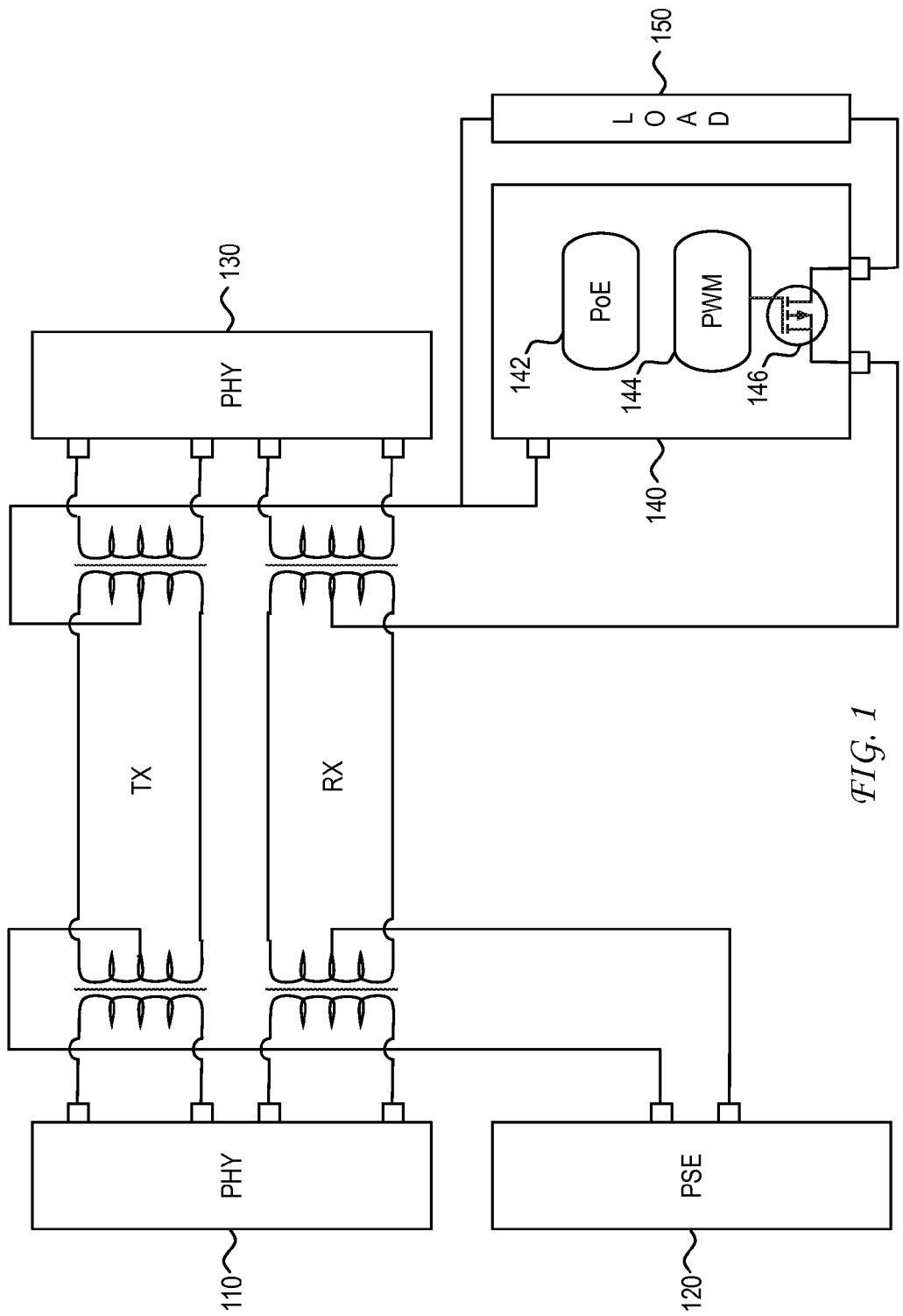
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other software controlled device such as embedded devices having an operating system (OS). This computing device can have highly varying power requirements depending on the existence and state of operation of various internal or externally supported components. Power usage can also be highly dependent on the application(s) running on the computing device.

Figure 2:
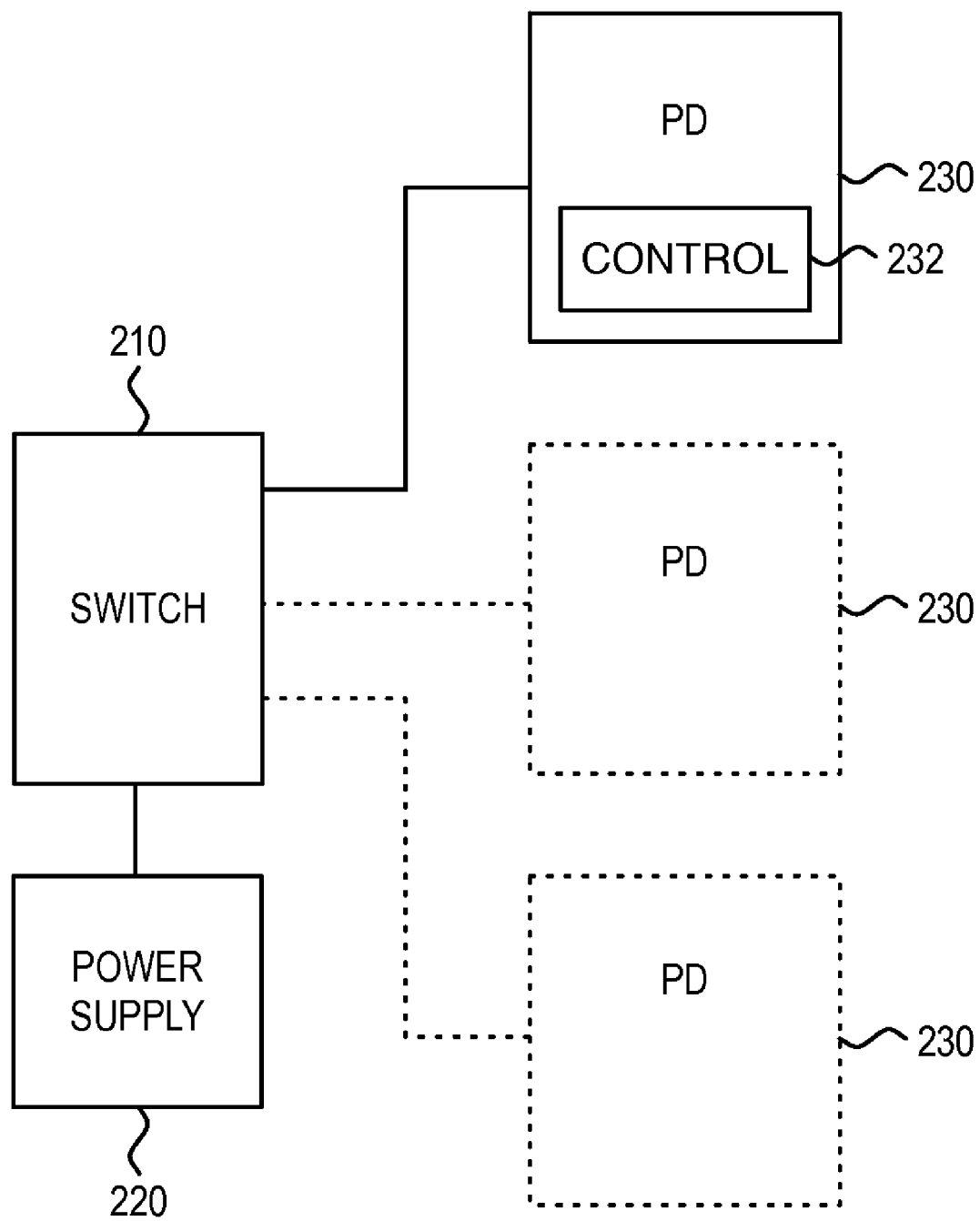
FIG. 2 illustrates an example PoE configuration in a computing environment.

In an enterprise environment, multiple computing devices can compete for a fixed power resource. FIG. 2 illustrates such an environment where multiple computing devices (or PDs) 230 are coupled to a switch 210. Switch 210 is designed to provide power to PDs 230 via power supply 220. Allocation of such power between PDs 230 can be based on various considerations of need and priorities. In one scenario, switch 210 can poll each of PDs 230 for information relating to power requirements of PDs 230. In one embodiment, communication between switch 210 and PDs 230 can based on Layer 2 communication.

Figure 3:
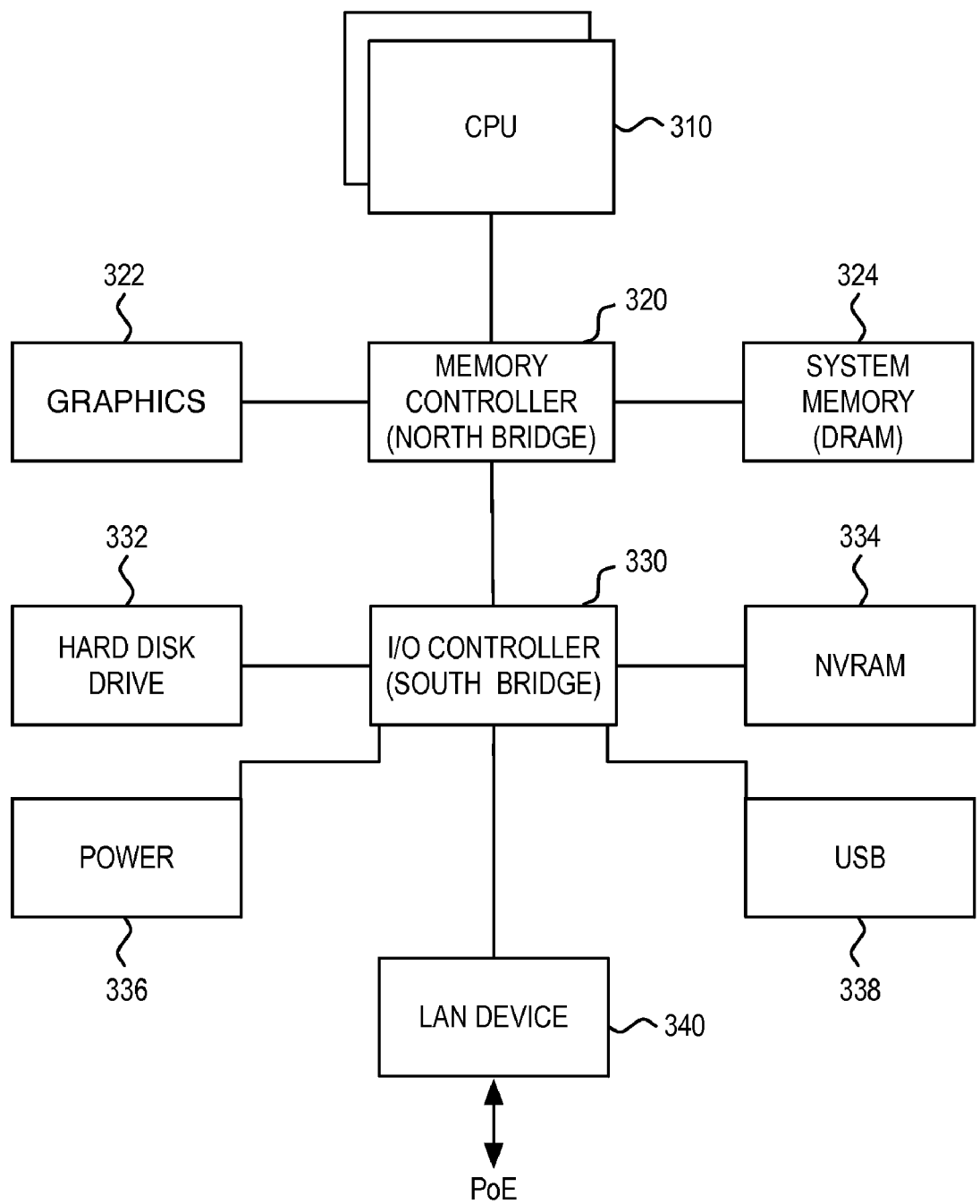
FIG. 3 illustrates an embodiment of a computing device.

As illustrated, each PD 230 includes control module 232 that facilitates communication with switch 210. In one embodiment, control module 232 can be implemented as part of a LAN device. FIG. 3 illustrates an embodiment of a computing device that incorporates such a LAN device. As illustrated, a computing device includes conventional computing components such as CPU(s) 310, memory controller (north bridge) 320, and I/O controller (south bridge) 330. As illustrated, memory controller 320 can be coupled to graphics subsystem 322 and main system memory 324. I/O controller 330, on the other hand, can also be coupled to various components, including hard disk drive 332, nonvolatile RAM (NVRAM) 334, power subsystem 336 and USB controller 338. As would be appreciated, the example embodiment of FIG. 3 is not intended to be exhaustive or limiting. Various other memory controller and I/O controller configurations can be used with the principles of the present invention.

As FIG. 3 further illustrates, I/O controller 330 is also in communication with LAN device 340. In general, LAN device 340 provides networking functionality onto the motherboard, thereby eliminating the need for an add-in network interface card (NIC). In one embodiment, LAN device 340 includes a fully integrated 10/100/1000BASE-T Gigabit Ethernet media access controller (MAC), PCI Express bus interface, on-chip buffer memory, and integrated physical layer (PHY) transceiver in a single-chip solution. In other embodiments, the PHY may not be integrated such as when initially supporting higher-end PHYs (e.g., 10GBASE-T). In other embodiments, LAN device 340 can also include a wireless communication component.

Figure 4:
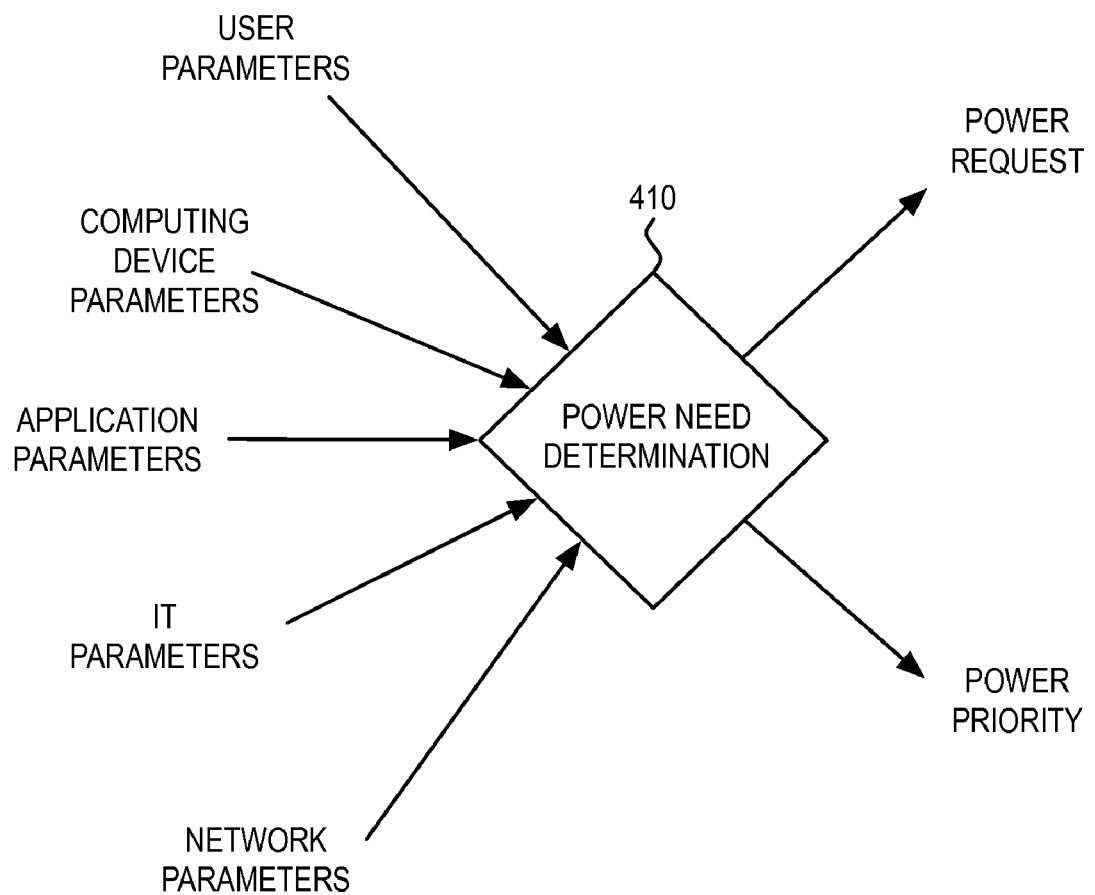
FIG. 4 illustrates an example mechanism of generating a power request and priority.

As noted, allocation of power between PDs 230 can be based on various considerations. FIG. 4 illustrates an example mechanism of generating a power request and priority for a computing device. As illustrated, various power management information can be used as inputs to power need determination 410. In this example, the power management information includes general classes of information such as user parameters (e.g., management, engineering, admin, user priority level, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). As would be appreciated, the principles of the present invention would not be dependent on the particular set of power management information that is used as input. With this input set of power management information, power need determination 410 can then produce a power request and power priority for the computing device. In various embodiments, the power need determination can be performed at either the switch or at the PD. Communication of either the power management information or the power request/priority information from the PD to the switch can be effected via Layer 2 packets (e.g., LLDP).

In general, power is allocated to each of PDs 230 based on an analysis of the determined power requirements and available amount of power at power supply 220. Where power supply 220 does not have enough power for all of PDs 230 a priority algorithm would be applied. In general, the priority algorithm would be designed to identify how best to allocate an oversubscribed power supply budget.

In a simple example, a priority order can be indiscriminate to the PDs by allocating power on a "first-come, first-served" basis. This methodology results in a race condition between PDs. In another example, a priority order can be based on an operating mode of the PDs. Here, a computing device in a presentation mode may be given a higher priority relative to another computing device that is in a note-taking mode. In yet another example, a priority order can be based on user priority levels. Here, a management personnel user may be given a higher priority relative to an administrative personnel user.

As would be appreciated, various priority algorithms can be defined to allocate power from an oversubscribed power supply. Regardless of the basis by which an oversubscribed power supply is allocated, there remains the risk that certain PDs will not have a high enough "priority" to receive power from the power supply. A starvation condition would therefore result for those PDs if the situation persists.

Figure 5:
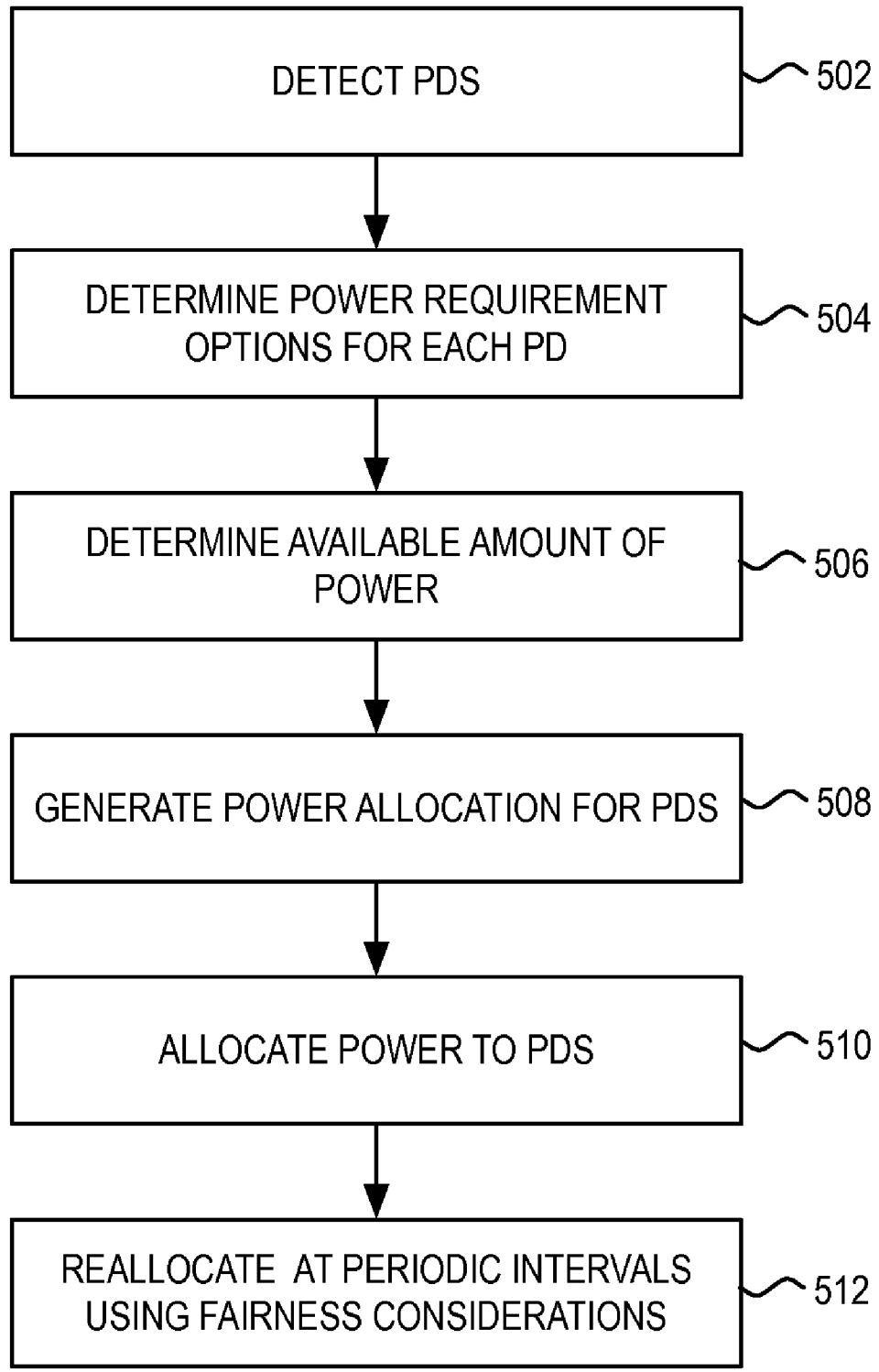
FIG. 5 illustrates a flowchart of a process of allocating power to powered devices using fairness considerations.

In the present invention, it is recognized that an element of fairness is needed to prevent the occurrence of starvation conditions. To illustrate this feature of the present invention, reference is now made to the flowchart of FIG. 5. As illustrated, the process begins at step 502 where one or more PDs are detected. Next, at step 504, power requirement options for each PD are determined. As part of this process, the switch can poll each of the PDs for its power requirements. In one embodiment, one or more power request/priority options that is generated by a power need determination is obtained from the various PDs.

In general, a starvation condition can result if a PDs relative priority continues to fall short of a priority threshold that delineates the PDs that are powered and the PDs that are not powered. One reason for such an occurrence could involve the nature of the PD's power request/priority. Typically, a PD would generate a single power request/priority that reflects the result of a power need determination. Where the single power request/priority is designed to represent the PD's ideal power needs, the request may have a difficult time meeting the priority threshold. This situation can easily persist leading to a starvation condition.

In accordance with the present invention, a potential starvation condition is averted through the PD's generation of multiple power request/priority options for the switch to consider. For example, a PD can generate three different power request/priority options such as the following: Option A for 25 W of power at a moderate priority level, Option B for 13 W of power at a higher priority level, and Option C for 6 W of power at a highest priority level. In this example, Option A may be sufficient for powering and charging a computing device, Option B may be sufficient for powering the computing device with no battery drain, and Option C may be sufficient for slowing the battery drain of the computing device to accommodate X hours of use. By providing three different power request/priority options for the switch to consider, the PD is more likely to have some level of powering granted by the switch. This results since the switch's decision to allocate power to the PD would not be dependent on the provision of a full 25 W of power. Lowering powering options, with or without a higher priority level, may be sufficient to assure that the PD's power request/priority exceeds the priority threshold. A further advantage of creating multiple power request/priority options is the elimination of complex power negotiation or reallocation schemes.

In one embodiment, the power requirement option(s) can also include a time parameter. This time parameter provides another mechanism by which the switch can evaluate the power requirement option(s) between one or more PDs. For example, a first PD can request 25 W of power for 30 minutes, a second PD can request 10 W of power for 45 minutes, a third PD can request 8 W of power for 20 minutes or 20 W of power for 10 minutes, etc. With the availability of the time parameter, the switch can make intelligent decisions regarding which requests should be granted when considering the duration of the request. This is in contrast to conventional power requests that seek an allocation of power for an indefinite period of time.

After the power requirement option(s) are determined for each PD, an available amount of power at the power supply is determined at step 506. Here, the switch would determine the available amount of power at the power supply that can be provided to the various connected PDs. As would be appreciated, one or more power supplies can be available to the switch.

At step 508, an allocation of power is determined for each PD based on the determined power requirements and available amount of power at the power supply. As would be appreciated, the particular methodology by which the allocation is determined would be implementation dependent. In an oversubscribed situation, it will typically be the case that a subset of the requesting PDs would be denied any power allocation. In one embodiment, the switch would send a message to the various PDs confirming or denying the power requests. The determined allocation of power to the PD requests that met the priority threshold would then commence at step 510.

At this point, a certain subset of requesting PDs would not receive an allocation of power. This will typically occur regardless of the priority algorithm implemented. To prevent starvation conditions from developing, the switch can also perform at step 512 a power reallocation at periodic intervals. This power reallocation need not be initiated based on a detection of a new PD or receipt of a new power request.

In one embodiment, the power reallocation would be based on fairness considerations. In a simple example, the fairness consideration can be designed to ensure that no PD fails to receive power during a certain period of time (e.g., 1 hour). In this example, the switch can track which PDs have received power and which PDs have not received power over a span of time. This span of time can include the initial power allocation and/or one or more power reallocations. If it is determined that one or more PDs have not received power in that span of time, the switch can choose to override (or artificially increase a priority level) such that the one or more PDs are assured of receiving power in the next power reallocation. It is a feature of the present invention that this process can be initiated by the switch and not by the PD. The purpose here is to ensure that all PDs receive at least a minimal form of power allocation regardless of the nature of their power request.

It should be noted that the example described above is not intended to be limiting. Other more complex fairness considerations and algorithms can be included to balance the competing needs of the various connected PDs.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments.

Also, it is to be understood that the phraseology and terminology employed herein are for the purposes of description and should not be regarded as limiting.

What is claimed is:

1. A power over Ethernet method, comprising:
   receiving at least two power requests from a computing device, each of said power requests representing alternative requests for power for said computing device, wherein neither of said at least two power requests are received after a denial of a previous power request;
   approving one of said at least two power requests; and
   allocating power to said computing device based on said approved power request.

2. The method of claim 1, wherein said at least two power requests are received contemporaneously.

3. The method of claim 1, wherein said at least two power requests specify different power levels.

4. The method of claim 1, wherein said at least two power requests specify different power priorities.

5. The method of claim 1, wherein said at least two power requests specify different periods of time during which power is needed.

6. The method of claim 1, wherein said approving is based on consideration of power requests received from other computing devices.

7. A power over Ethernet method, comprising:
   receiving a power request from a computing device; and
   allocating power to said computing device based on approval of said power request, wherein said allocation of power to said computing device is limited in duration to a period of time that is identified prior to said allocation, wherein said period of time is determined at a switch that receives said power request and is based on a power subscription level at said switch.

8. The method of claim 7, wherein said period of time is specified in said received power request.

9. The method of claim 8, wherein said period of time is determined based on a priority of said power request.

10. The method of claim 8, wherein said period of time is determined based on a power level of said power request.

11. A power over Ethernet system, comprising:
    a detection component that determines whether a powered device that is coupled to said power over Ethernet system via a network cable is a valid device for receiving power; and
    a controller that is configured to analyze at least two power requests that are received from said powered device, each of said power requests representing alternative requests for power for said powered device, wherein neither of said at least two power requests are received after a denial of a previous power request, said controller being further configured to approve one of said at least two power requests and allocate power to said powered device based on said approved power request.

12. The system of claim 11, wherein said at least two power requests are received contemporaneously.

13. The system of claim 11, wherein said at least two power requests specify different power levels.

14. The system of claim 11, wherein said at least two power requests specify different power priorities.

15. The system of claim 11, wherein said at least two power requests specify different periods of time during which power is needed.

16. The system of claim 11, wherein said approving is based on consideration of power requests received from other powered devices.

* * * * *

UNITED STATES PATENT AND TRADEMARK OFFICE
CERTIFICATE OF CORRECTION

| | |
|---|---|
| PATENT NO. | : 8,301,919 B2 |
| APPLICATION NO. | : 13/032244 |
| DATED | : October 30, 2012 |
| INVENTOR(S) | : Diab et al. |

It is certified that error appears in the above-identified patent and that said Letters Patent is hereby corrected as shown below:

Col. 6, line 35, replace "8" with --7--.

Col. 6, line 37, replace "8" with --7--.

Signed and Sealed this

First Day of January, 2013

David J. Kappos
*Director of the United States Patent and Trademark Office*